United States Patent [19]

Watanabe

[11] Patent Number: 5,218,603
[45] Date of Patent: Jun. 8, 1993

[54] NODE UNIT AND COMMUNICATIONS METHOD FOR LOCAL AREA NETWORK

[75] Inventor: Akira Watanabe, Kanagawa, Japan

[73] Assignee: Mitsubishi Denki Kabushiki Kaisha, Japan

[21] Appl. No.: 600,603

[22] Filed: Oct. 19, 1990

[30] Foreign Application Priority Data

Oct. 19, 1989 [JP] Japan ............................ 1-272110
Apr. 27, 1990 [JP] Japan ............................ 2-113669

[51] Int. Cl.⁵ .................................. H04L 12/46
[52] U.S. Cl. ............................ 370/85.13; 370/92; 370/85.15
[58] Field of Search ............ 370/85.13, 85.14, 85.4, 370/85.12, 85.15, 85.5, 110.1

[56] References Cited

U.S. PATENT DOCUMENTS

| | | | |
|---|---|---|---|
| 4,627,052 | 12/1986 | Hoare et al. | 370/85.13 |
| 4,680,756 | 7/1987 | Sugimoto et al. | 370/85.14 |
| 4,769,814 | 9/1988 | Bederman et al. | 370/85.12 |
| 4,811,009 | 3/1989 | Orimo et al. | 340/825.05 |
| 4,843,606 | 6/1989 | Bux et al. | 370/85.4 |
| 4,922,503 | 5/1990 | Leone | 370/85.13 |
| 4,926,375 | 5/1990 | Mercer et al. | 370/85.6 |
| 4,930,123 | 5/1990 | Shimizu | 370/94.1 |
| 4,933,938 | 6/1990 | Sheehy | 370/85.13 |
| 5,008,879 | 4/1991 | Fischer et al. | 370/85.4 |
| 5,018,137 | 5/1991 | Backes et al. | 370/85.13 |

FOREIGN PATENT DOCUMENTS 0156542 10/1985 European Pat. Off. .
0243590 11/1987 European Pat. Off. .
1538023 1/1979 United Kingdom .

*Primary Examiner*—Benedict V. Safourek
*Assistant Examiner*—Min Jung
*Attorney, Agent, or Firm*—Wolf, Greenfield & Sacks

[57] ABSTRACT

A communications method for a local area network system including a trunk local area network (1); a plurality of node units (N) provided on the trunk local area network and having a terminal table (TB); a branch local area network (2) connected to each of the node units; and a terminal device (T) connected to the branch local area network, which comprises the steps of comparing a group number of a frame received by the node unit from the trunk area network with a group number of its own to produce a first result and comparing a source address (SA) of the frame with an address stored in the terminal table to produce a second result; and erasing or transferring the frame between the node units based on the first and second results, thereby controlling communications between the terminal devices.

10 Claims, 9 Drawing Sheets

SD  FC  DA  SA  I  CRC  ED

RECEPTION FROM BRANCH LAN

NODE UNIT AND COMMUNICATIONS METHOD FOR LOCAL AREA NETWORK

BACKGROUND OF THE INVENTION

1. Field of the Invention

The present invention relates to node units and communications methods using the node units which link a trunk local area network (herein after "trunk LAN") to a number of branch local area networks (hereinafter "branch LANs") each having a number of terminal devices.

2. Description of the Prior Art

FIG. 6 shows a network system employing four conventional node units, wherein a trunk LAN is connected to four branch LANs for extending the communications area but minimizing an increase in the system traffic by a bridge function or transmitting only the frame necessary for the communications. The network system includes a trunk LAN 1; four branch LANs 2-1, 2-2, 2-3, and 2-4 each connected to the trunk LAN 1; five terminal devices T connected to the branch LANs, two for the branch LAN 2-1 and one for each of the branch LANs 2-2, 2-3 and 2-4, each terminal device having an address TA1, TA2, TA3, TA4, or TA5; four node units N1, N2, N3, and N4 for connecting the branch LANs 2-1, 2-2, 2-3, and 2-4 to the trunk LAN 1, each node unit having a filtering table TB1, TB2, TB3, or TB4 for storing terminal addresses of the terminal devices T connected to its own branch LAN.

Arrows 10, 11, 12, and 13 represent communications from the terminal device T of the terminal address TA1 to the terminal device T of the terminal address TA2; from the terminal device T of the terminal address TA1 to the terminal device T of the terminal address TA3; from the terminal device T of the terminal address TA1 to the terminal device T of the terminal address TA4; from the terminal device T of the terminal address TA1 to the terminal device T of the terminal address TA5, respectively.

FIG. 7 shows the format of a communications frame between terminal devices. The format includes a starting delimiter SD for indicating the start of a frame; a frame control FC for identifying the frame type; a destination address DA for identifying the address of a destination terminal; a source address (an address of a sender) SA for identifying the address of a sending terminal; information I; a frame error checking code CRC; and an ending delimiter ED for indicating the end of a frame.

Only the five terminal devices are used in the simple system of FIG. 6 but, in general, a large number of terminal devices are connected to each branch LAN, and a large number of node units are used. There are some differences between the branch LAN and the trunk LAN in the contents of a frame format in FIG. 7, such as code systems of the starting delimiter SD and the ending delimiter ED and definitions of the frame control FC, because of different communications protocols, but the basic contents, such as those of the destination address DA, the source address SA, and the information I, are identical.

In operation, the node units N1-N4 monitor the contents of all frames sent out on the branch LANs 2-1 through 2-4 and automatically form the filtering tables TB1-TB4. In other words, each node unit N1-N4 is able to identify the terminal devices connected to its own branch LAN by investigating the source address SA of a received frame format. In FIG. 6, the terminal addresses TA1 and TA2, TA3, TA4, and TA5 are automatically registered in the filtering tables TB1, TB2, TB3, and TB4, respectively. Then, each node unit N1-N4 receives all frames running on the branch LANs 2-1 through 2-4 and the trunk LAN 1 and determines whether the frame is to be transferred or not based on the contents of its filtering table TB1-TB4.

FIG. 8 shows a filtering process or how a node unit processes a frame received from a branch LAN. When a certain node unit Ni received a frame from a branch LAN 2-i, the node unit Ni retrieves the contents of a destination address DA in the frame from the filtering table TBi (Step 31). If the identical address has been registered in the filtering table TBi, the frame is erased because this frame is addressed to its own branch LAN (Step 32). If no identical addresses are registered, on the other hand, the frame is transferred to the trunk LAN 1 because it is addressed to another branch line (Step 33).

FIG. 9 shows another filtering process or how a node unit processes a reception from the trunk LAN. Upon reception of a frame from the trunk LAN 1, the node unit retrieves the contents of a destination address DA from the filtering table TBi in the frame in the same way as described above (Step 41). If the identical address has been registered in the table TBi, the node unit transfers the frame because it is addressed to its branch line from another (Step 42). If no identical addresses are registered, on the other hand, the node unit erases the frame because it is not addressed to its branch line (Step 43).

For example, the destination address DA of a frame indicated by the arrow 10 in FIG. 6 is the terminal address TA2. Accordingly, the frame is not transferred to another node by the above filtering process so that the frame is erased in the node unit N1. For example, the destination address DA of a frame indicated by the arrow 11 is the terminal address TA3. Consequently, the frame is transferred in the node units N1 and N2 by the filtering process but erased in the node units N3 and N4. The frames indicated by the arrows 12 and 13 are processed in the same way as described above.

In this way, the node units make a proper decision whether a frame is to be transferred or erased for communications among the respective terminal devices so that only the necessary frame runs on the trunk and branch LANs, thus minimizing an increase in the traffic.

In the above conventional communications method it is possible to extend the communications area by connecting branch LANs to the trunk LAN, but it has been difficult to maintain security of information because the terminal device of the specified node is always ready to respond. Also, it has been impossible to inhibit communications between specified branch LANs at will. Conversely, it has been impossible to release the inhibition for only the specified terminal devices to communicate between the inhibited branch LANs.

SUMMARY OF THE INVENTION

Accordingly, it is an object of the invention to provide a node unit capable of establishing high degrees of secrecy or security by prohibiting communications between specified branch LANs while permitting specified terminal devices to make communications between the prohibited branch LANs.

Other objects, features, and advantages of the invention will be apparent from the following description

DESCRIPTION OF THE PREFERRED EMBODIMENT

Figure 2:
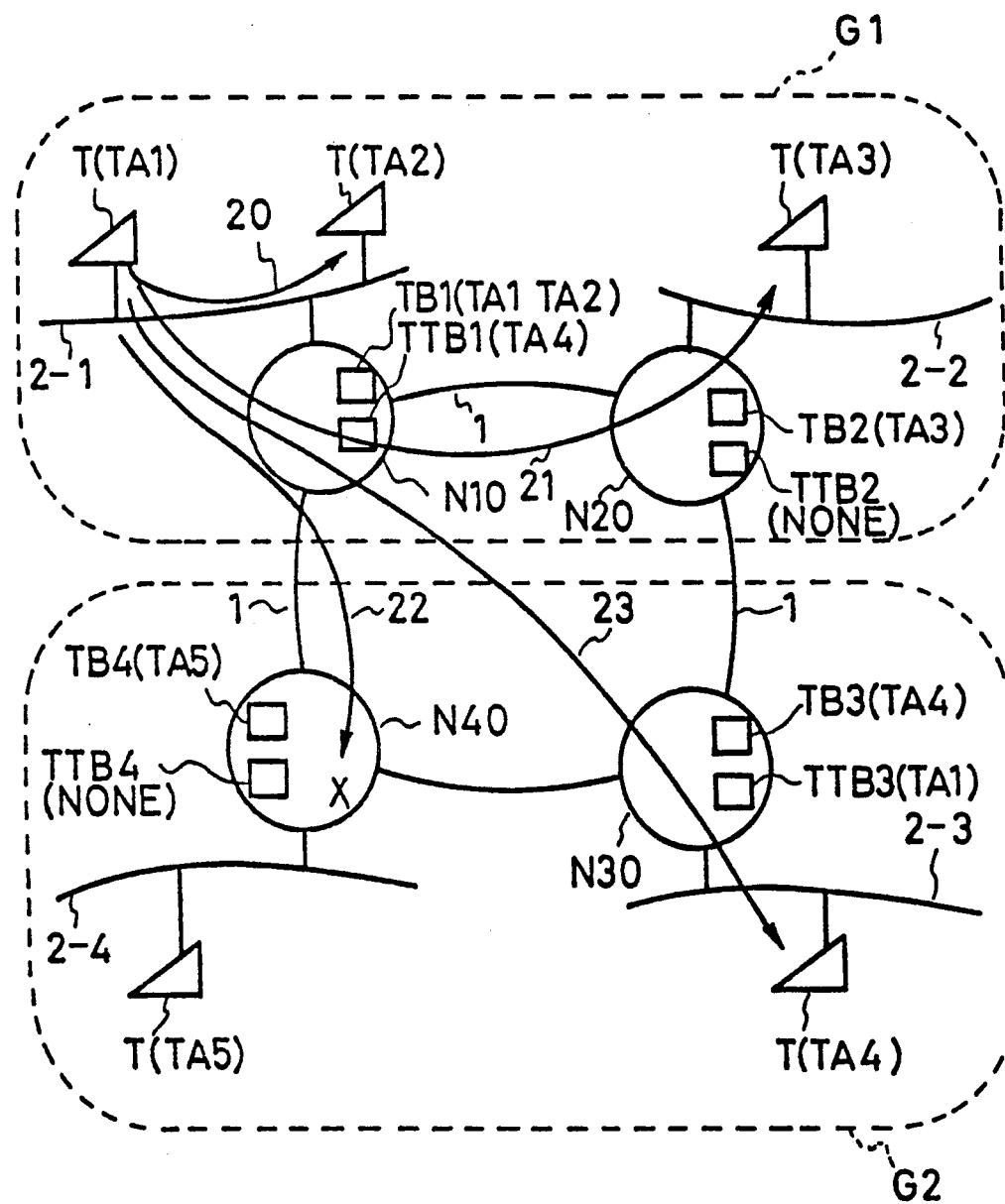
FIG. 2 is a schematic diagram of a network system using the node unit of FIG. 1.

First, reference is made to FIG. 2. The network system includes a trunk LAN 1; four branch LANs 2-1, 2-2, 2-3, and 2-4 each connected to the trunk LAN 1; five terminal devices T connected to the branch LANs, two for the branch LAN 2-1 and one for each of the branch LANs 2-2, 2-3, and 2-4, each terminal device having a terminal address TA1, TA2, TA3, TA4, or TA5; and four node units N10, N20, N30, and N40 according to an embodiment of the invention. The branch LANs 2-1 through 2-4 are divided into two groups identified by group numbers G1 and G2 as shown by broken lines. These group numbers G1 and G2 are set in the respective node units N10, N20, N30, and N40 by means of a switch or the like.

Arrows 20, 21, 22, and 23 represent communications from the terminal device T of the address TA1 to the terminal device T of the address TA2 in the same branch LAN; from the terminal device T of the address TA1 to the terminal device T of the address TA3 in the same group; from the terminal device T of the address TA1 to the terminal device T of the address TA5 in the other group; and from the terminal device T of the address TA1 to the terminal device T of the address TA4 in the other group, respectively.

Figure 1:
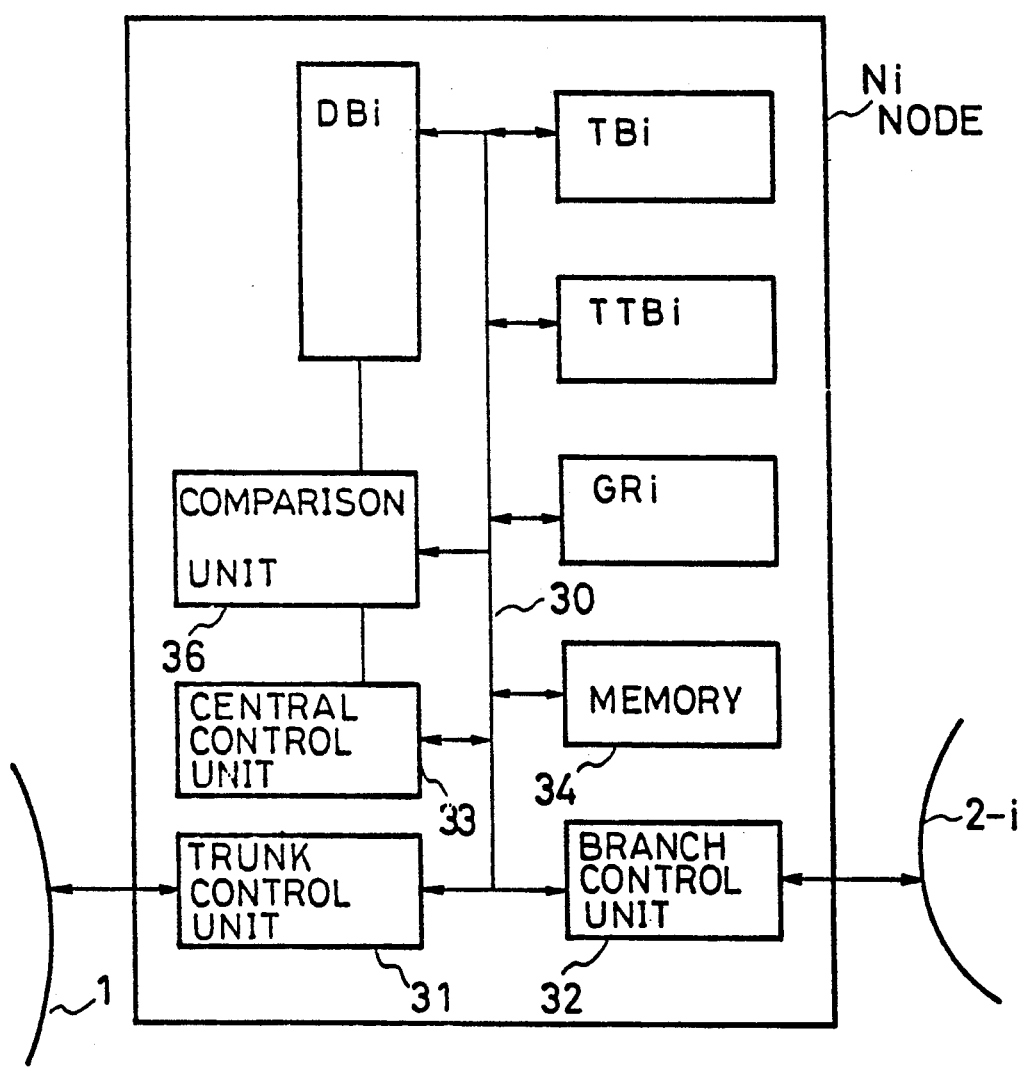
FIG. 1 is a block diagram of a node unit according to an embodiment of the invention.

Each node unit Ni will now be described with reference to FIG. 1. The node unit Ni includes a trunk control unit 31 for controlling connection with the trunk LAN; a branch control unit 32 for controlling connection with a branch LAN 2-i; and a bus 30 connected to both the control units 31 and 32. Also, it includes a filtering table TBi for storing terminal addresses of terminal devices T connected to its branch LAN 2-i and a privilege terminal table TTBi; a group register GRi; a central control unit 33 for controlling this node Ni; a memory 34 for storing a program for the central control unit 33; a data buffer DBi for temporarily storing a frame received from the trunk LAN 1 or a branch LAN 2-i; and a comparison unit 36 for comparing data between the data buffer DBi and the filtering table TBi, and the privilege terminal table TTBi and the group register GRi.

The group number G1 of G2 is registered in the group register GRi. Where there are a large number of nodes Ni, the number of groups Gi may be set according to the objective. This grouping technique is used, for example, to select nodes which do not want to communicate in the same trunk LAN. The address TAi of a terminal device T which belongs to the other group may be registered in a privilege terminal table TTBi. This is used, for example, to establish a special permission for communications between different groups G1 and G2.

Figure 3:
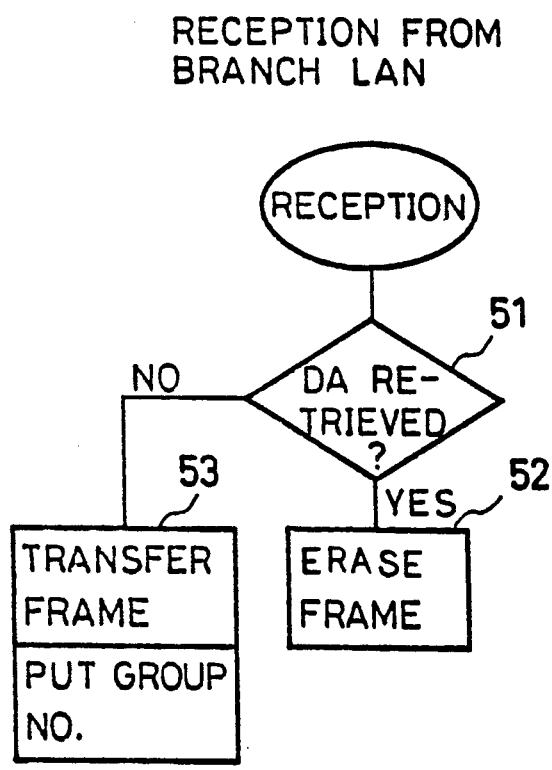
FIG. 3 is a flow chart useful for explaining how the node unit of FIG. 1 processes a frame received from a branch LAN.
Figure 7:
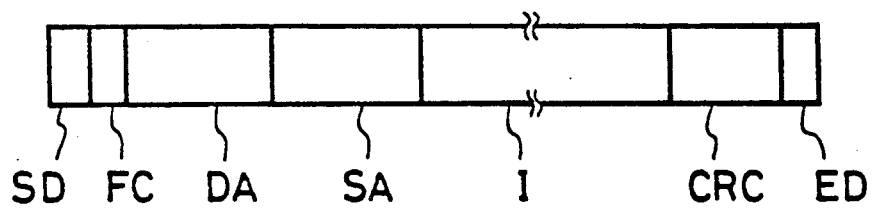
FIG. 7 is a diagram showing the format of an ordinary communications frame between terminal devices.
Figure 8:
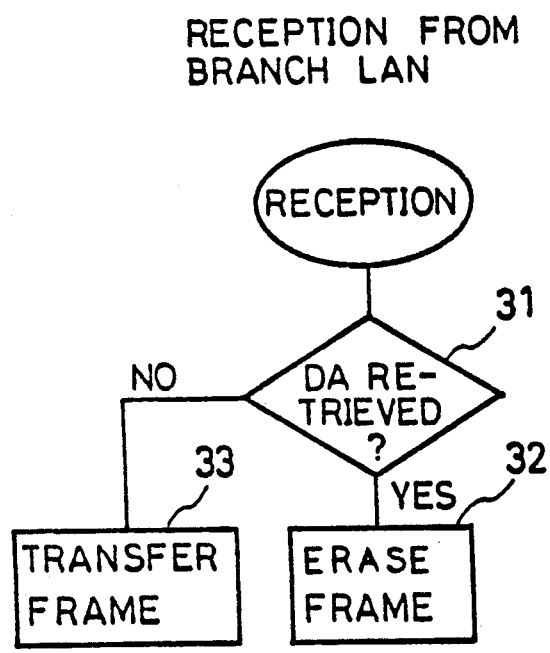
FIG. 8 is a flow chart useful for explaining how the conventional node unit processes a frame received from a branch LAN.
Figure 9:
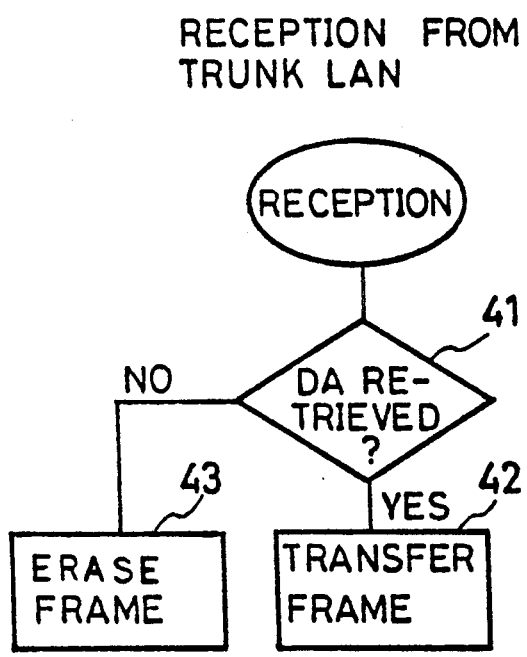
FIG. 9 is a flow chart useful for explaining how the conventional node unit processes a frame received from the trunk LAN.

FIG. 3 shows a filtering process or how a node unit Ni processes a frame received from a branch LAN 2-i. When a certain node unit Ni receives a frame of FIG. 7 from a branch LAN 2-i, the frame data is stored in the data buffer DBi via the trunk control unit 31. The node unit Ni then retrieves the contents of a destination address DA in the frame from the filtering table TBi. That is, the comparison unit 36 reads the terminal address TAi of a terminal device T on its branch line 2-i from the filtering table TBi and the frame data from the data buffer DBi, determines whether these data are identical or not, and transmits the detection result to the central control unit 33 (Step 51). If the identical address has been registered in the table TBi, the trunk control unit 31 is instructed to erases the frame because it is addressed to its branch line (Step 52). If no identical addresses are registered, on the other hand, the trunk control unit 31 is instructed to put information about the group number of its node unit Ni on the frame for identification and transfer it to the trunk LAN 1 (Step 53). The group number occupies part of the frame control field FC in FIG. 7.

Figure 4:
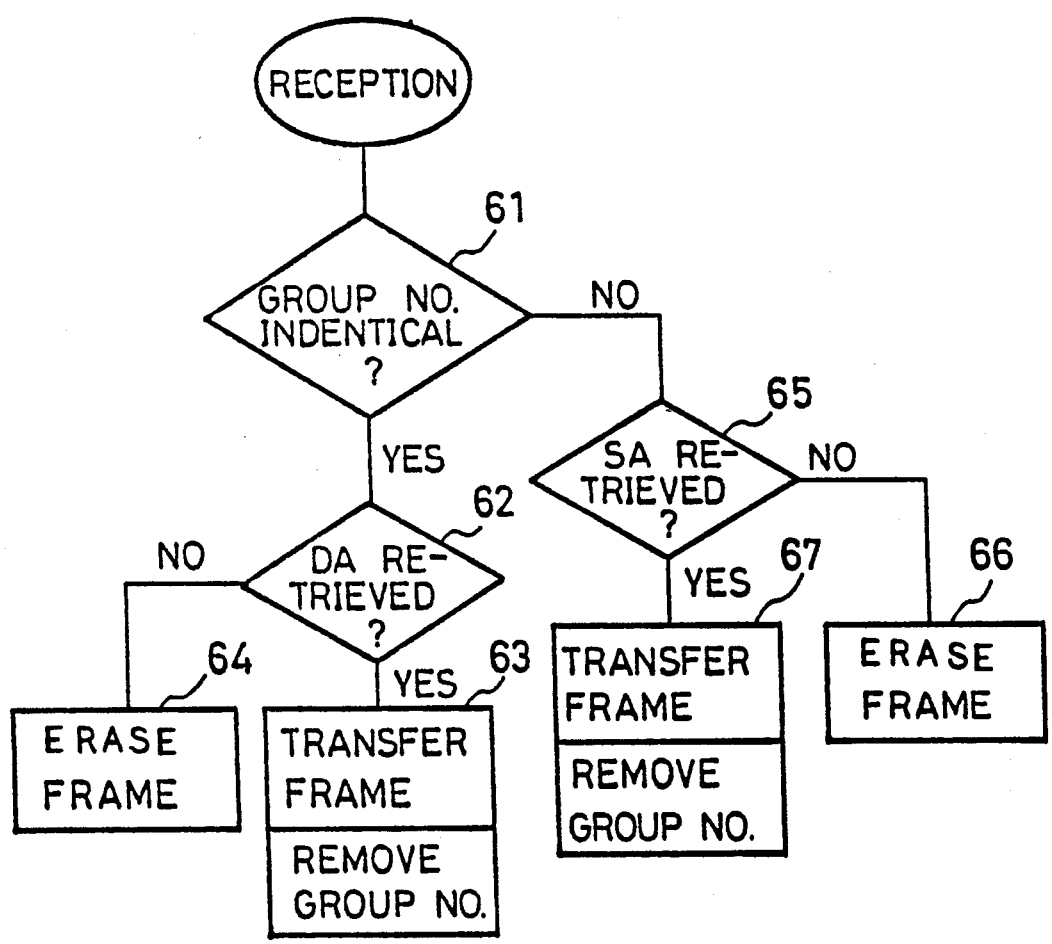
FIG. 4 is a flow chart useful for explaining how the node unit of FIG. 1 processes a frame received from the trunk LAN.

FIG. 4 shows another filtering process or how a node unit Ni processes a frame received from the trunk LAN 1. When a certain node unit Ni receives a frame of FIG. 7 from the trunk LAN 1, the frame data is stored in the data buffer DBi via the trunk control unit 31. Then, the node unit Ni compares information of the group number within the frame with the group number of its own station. That is, the comparison unit 36 compares the contents of the group register GRi with the contents of the data buffer DBi (Step 61). If the group numbers are identical, the contents of a destination address DA in the frame is retrieved from the filtering table TBi because both of the groups want to communicate (Step 62). That is, the comparison unit 36 further compares the contents of the filtering table TBi with the contents of the data buffer DBi. If the identical address has been registered in the table TBi, the frame is transferred to the branch LAN to start inter-group communications (Step 63). The group number becomes unnecessary at this point and is removed. If no identical addresses are registered in Step 62, on the other hand, the frame is erased because it is not addressed to the terminal of this branch LAN (Step 64). That is, the comparison unit 36 transmits a non-match signal to the central control unit 33, which in turn prohibits transmission to the branch LAN 2-i and erases the frame from the data buffer DBi.

If the group numbers are not identical in Step 61, the contents of a source address SA in the frame are retrieved from the privilege terminal table TTBj (Step 65). That is, the comparison unit 36 compares data about the terminal address from the data buffer DBi with data within the privilege terminal table TTBi and transmits a match or non-match signal to the central control unit 33.

If there is a non-match and no identical addresses registered in the table TTBj, the frame is erased (Step 66). That is, the central control unit 33 prohibits to transmit this frame to the branch LAN 2-i and erases the frame data from the data buffer DBi.

If the identical address has been registered, the frame is transferred to the branch LAN because the terminal devices especially want to communicate even if they belong to different groups (Step 67). The group number becomes unnecessary and is removed at this point.

The operation will be described in more detail where the privilege address of FIG. 2 is designated as follows: Communications permissible privilege addresses TA4 and TA1 are set in the privilege terminal table TTB1 of the group number G1 and TTB3 of the group number G2, respectively, while no addresses are set in the privilege terminal tables TTB2 and TTB4.

The frames indicated by the arrows 20-23 are processed by the filtering processes of FIGS. 3 and 4 as follows: The frame of the arrow 20, which is transmitted within the same branch LAN, is erased in the node unit 10. The frame of the arrow 21, which is transmitted within the same group, is transferred or erased in the node units N10 and N20. The frame of the arrow 22, which is transmitted to a different branch LAN, is transferred in the node unit N10 but erased in the node unit N40 even if there is the destination terminal because it is outside the group. That is, it is impossible to complete this communication. The frame of the arrow 23, which is transmitted to a different group, is transferred in the node units N10 and N30 because the terminal address TA1 of the sending source is registered in the privilege terminal table TTB3 of the node unit N30 as a permissible terminal address. The backward frame (from the terminal device T of the address TA4 to the terminal device of the address TA1) is transferred in the node units N30 and N10 because the terminal address TA4 of a sending source is registered in the privilege terminal table TTB1 of the node unit N10. Thus, the terminal devices T of the terminal addresses TA1 and TA4 are able to communicate each other because they are permitted to do so even if they belong to different groups.

In the above embodiment, the branch and trunk LANs are represented in bus and ring configurations, respectively, but they may be configured the other way around. The group numbers may be set so that each node unit always has one group number or a single node has a plurality of group numbers. A plurality of terminal addresses TA may be registered in a single privilege terminal table TTBi.

Figure 5:
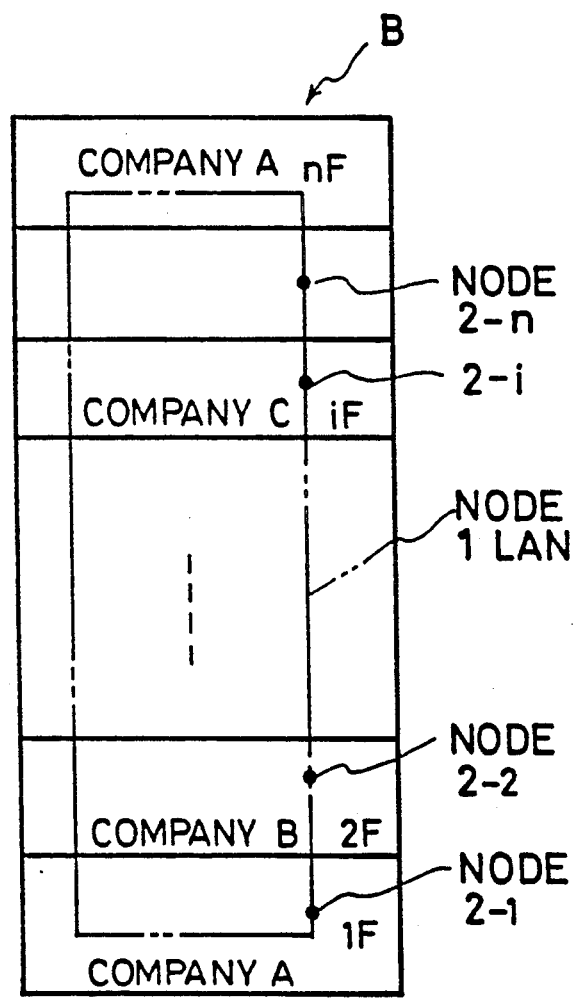
FIG. 5 is a schematic diagram of a network system according to another embodiment of the invention.
Figure 6:
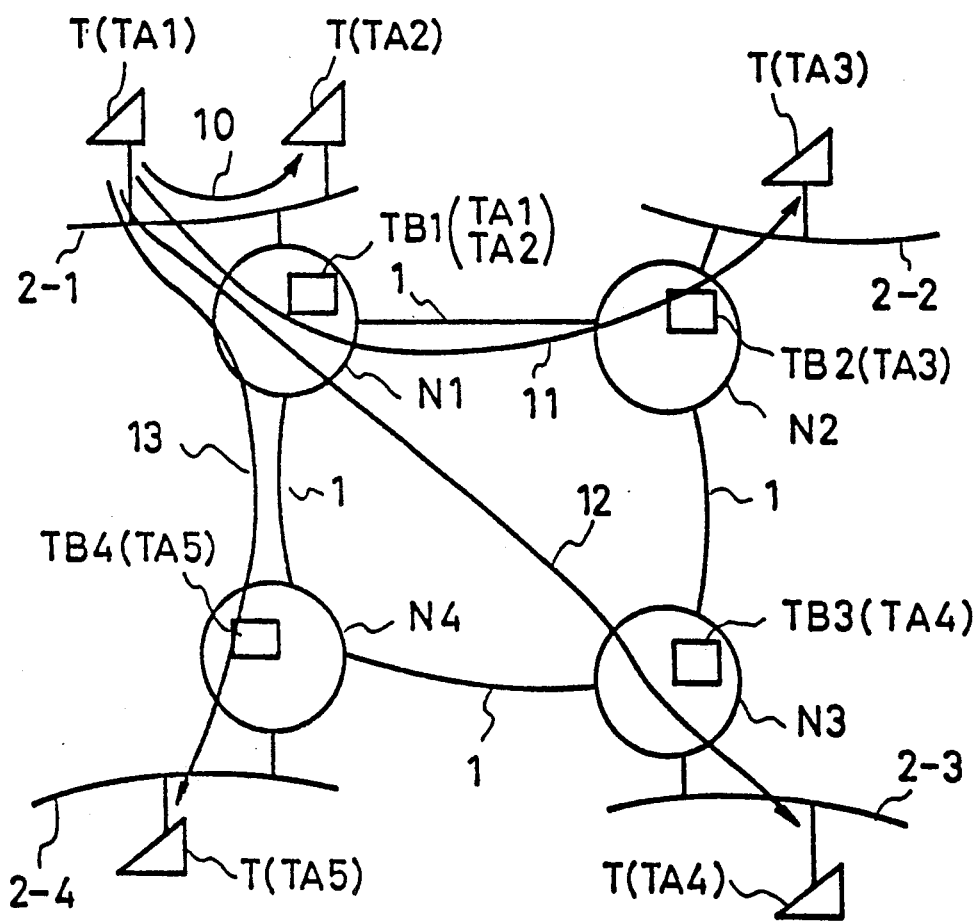
FIG. 6 is a schematic diagram of a network system using conventional node units.

The grouping is useful where a plurality of users use a large number of nodes provided on the same trunk line and each user wants independence and secrecy of his or her information. For example, FIG. 5 shows an n-story building B in which a trunk LAN and n nodes N1-Nn are installed, one node for each story. If three companies A, B, and C occupy the first and the n-th floors, the second floor, and the i-th floor, respectively, and their interests are conflict against each other, three different group numbers are given to the respective companies A, B, and C and are registered in the group registers GR of the respective node units, thereby permitting communications within only the same group.

As has been described above, according to the invention, communications are permitted between only specified terminal devices which belong to different groups. Consequently, the branch LANs enjoy higher levels of independence, functionality, and security.

What is claimed is:

1. A communications method for a local area network system which includes a trunk local network; a plurality of node units provided on said trunk local area network, each of said node units having a terminal table; a branch local area network connected to each of said node units; and at least one terminal device connected to each branch local area network, said communications method comprising the steps of:

assigning each node unit to one of a plurality of groups, communication between terminal devices of the same group being permitted and communication between terminal devices of different groups being prohibited except when special permission for communication between terminal devices of different groups is preestablished;

each of said node units comparing a group number of a frame received by the node unit from said trunk local area network with a group number of its own to produce a first result and comparing an address of a sender of said frame with an address stored in its own terminal table to produce a second result; and erasing or transferring said frame between said node units based on said first and second results, thereby controlling communications between terminal devices connected to different branch local area networks.

2. The communications method of claim 1, wherein said frame is transferred to said branch LAN if said frame group number and said its own group number are identical.

3. The communications method of claim 1, wherein said frame is transferred to said branch LAN if said frame group number and said its own group number are different and if said address of said sender and said address of said own terminal table are identical.

4. The communications method of claim 1, wherein said node units are divided into a plurality of groups, each provided with a group number.

5. The communications method of claim 1, wherein at least one of said node units is provided with a plurality of group numbers.

6. The communications method of claim 2, wherein said terminal table stores addresses of terminal devices connected to node units of different group numbers.

7. A node unit for connecting a trunk local area network to a branch local area network to which at least one terminal device is connected, comprising:

a group register for registering in said node unit a group number identifying one of a plurality of groups within which said node unit is located;

a terminal table for registering an address of said terminal device;

a data buffer for temporarily storing a frame transmitted from either of said trunk and branch LANs;

a comparison unit for comparing a group number contained in said frame with a group number of said group register and for comparing an address contained in said frame with an address of said terminal table to provide a comparison result; and a central control unit for controlling communications between said node unit and said trunk and branch LANs in response to said comparison result such that communication between terminal devices of the same group is permitted and communication between terminal devices of different groups is prohibited except when special permission for communication between terminal devices of different groups is preestablished.

8. The node unit of claim 7, wherein said terminal table comprises a filtering table for registering an address of a terminal device connected to the branch LAN of the node unit and a privilege terminal table for registering an address of a terminal device connected to a branch LAN of a different node unit.

9. The node unit of claim 7, wherein said group register comprises a register for registering a plurality of group numbers.

10. A communications method for a local area network system which includes a trunk local area network; a plurality of node units provided on said trunk local area network, each of said node units having a filtering table; a branch local area network connected to each of said node units; and at least one terminal device connected to each branch local area network, said communications method comprising the steps of:

dividing said node units into a plurality of groups and assigning group numbers to said groups wherein each group includes at least one node unit; and absent preestablished permission for communication between terminal devices of different groups, permitting communications between only node units given identical group numbers so that a frame is transferred between only terminal devices connected to said permitted node units.

* * * * *